(12) United States Patent
Dean et al.

(10) Patent No.: US 11,716,236 B2
(45) Date of Patent: Aug. 1, 2023

(54) SYSTEMS AND METHODS FOR OFDM PERFORMANCE ENHANCEMENT ON FREQUENCY SELECTIVE FADING CHANNELS

(71) Applicant: Morgan State University, Baltimore, MD (US)

(72) Inventors: Richard Dean, Marriottsville, MD (US); Tasmeer Alam, Baltimore, MD (US)

(73) Assignee: Morgan State University, Baltimore, MD (US)

( * ) Notice: Subject to any disclaimer, the term of this patent is extended or adjusted under 35 U.S.C. 154(b) by 0 days.

(21) Appl. No.: 17/454,847

(22) Filed: Nov. 15, 2021

(65) Prior Publication Data

US 2022/0158884 A1 May 19, 2022

Related U.S. Application Data

(60) Provisional application No. 63/113,432, filed on Nov. 13, 2020.

(51) Int. Cl.
*H04L 27/26* (2006.01)
(52) U.S. Cl.
CPC ................ *H04L 27/2646* (2013.01)
(58) Field of Classification Search
CPC ..... H04L 27/2646; H04L 1/20; H04L 1/0003; H04L 25/022; H04L 27/0008
See application file for complete search history.

(56) References Cited

U.S. PATENT DOCUMENTS

| | | | | |
|---|---|---|---|---|
| 3,946,395 A | * | 3/1976 | Kirchhoff | G01S 3/48 342/423 |
| 7,012,883 B2 | * | 3/2006 | Jalali | H04L 5/0046 370/252 |
| 7,126,996 B2 | | 10/2006 | Classon et al. | |

(Continued)

OTHER PUBLICATIONS

Wang et al., "A Simulation Testbed for Adaptive Modulation and Coding in Airborne Telemetry," Georgia Tech Applied Research Corp, May 2014, 14 pages.

(Continued)

*Primary Examiner* — Vineeta S Panwalkar
(74) *Attorney, Agent, or Firm* — Gregory M. Stone; Whiteford, Taylor & Preston LLP

(57) ABSTRACT

Systems and methods are provided for transmitting OFDM signals through a communication channel exhibiting frequency selective fading, such as an aeronautical 2-ray channel, using a signal modulation scheme at the transmitter that is selected based on a measurement of signal to distortion ratio (SDR) at the receiver. The SDR measurement at the receiver is used to generate an estimated best modulation scheme based on the real-time detection and measurement of SDR at the receiver, and provide feedback to the transmitter through a feedback channel of the newly selected modulation scheme. In certain configurations, the selected modulation scheme is one of multiple possible quadrature amplitude modulation (QAM) schemes, which enables adaptation of the transmitted OFDM signal to optimize throughput based on distortion of individual tones of the OFDM signal received at the receiver.

16 Claims, 8 Drawing Sheets

(56) References Cited

U.S. PATENT DOCUMENTS

| | | | | |
|---|---|---|---|---|
| 2005/0135497 A1* | 6/2005 | Kim | .................. | H04B 7/066 375/267 |
| 2007/0058736 A1* | 3/2007 | Nguyen | ............ | H04B 1/71637 375/343 |
| 2021/0391913 A1* | 12/2021 | Zhou | .................. | H04W 52/365 |

OTHER PUBLICATIONS

Wang et al., "A New Scheme for UAV TT&C and Information Transmission System," International Conference on Advances in Mechanical Engineering and Industrial Informatics, 2015, 5 pages.
Chaoxing et al., "Timing Synchronization and Ranging in Networked UAV-aided OFDM Systems," Journal of Communications and Information Networks, Dec. 2018, 3(4):45-54.

* cited by examiner

FIG. 9
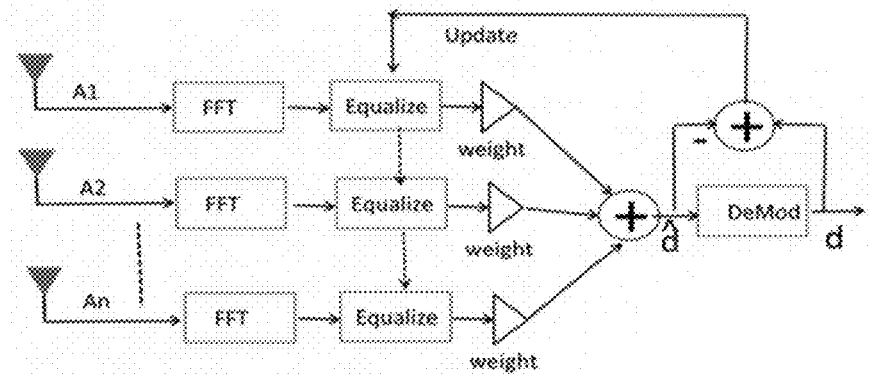
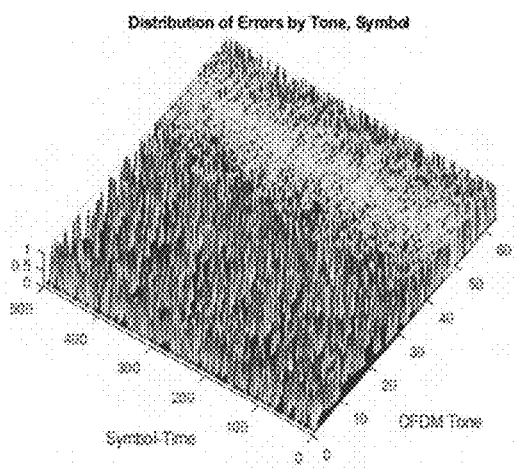
FIG. 10(a)
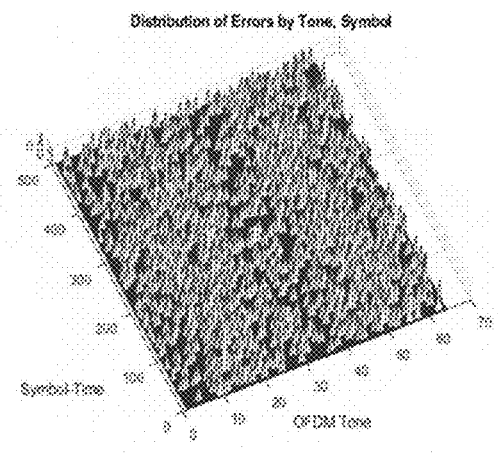
FIG. 10(b)
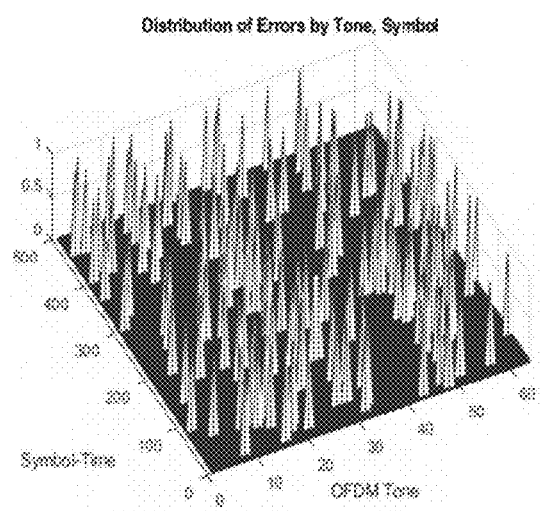
FIG. 11(a)
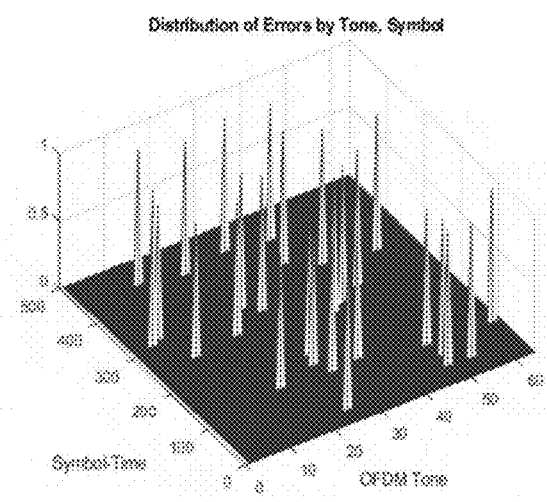
FIG. 11(b)

SYSTEMS AND METHODS FOR OFDM PERFORMANCE ENHANCEMENT ON FREQUENCY SELECTIVE FADING CHANNELS

CROSS REFERENCE TO RELATED APPLICATIONS

This application is based upon and claims the benefit of U.S. Provisional Application No. 63/113,432 titled "Adaptive OFDM for Aeronautical Channels," filed with the United States Patent & Trademark Office on Nov. 13, 2020, the specification of which is incorporated herein by reference in its entirety.

FIELD OF THE INVENTION

This invention is directed to systems and methods of signal processing, and more particularly to systems and methods for managing communications along communication channels having frequency selective fading using orthogonal frequency division multiplexing ("OFDM") signals.

BACKGROUND OF THE INVENTION

Improving the bandwidth efficiency of various communication channels has been one of the goals of the integrated Network Enhanced Telemetry (iNET) project. Given a fixed amount of spectrum, challenges exist in increasing spectrum efficiency. One option for improving spectral efficiency is OFDM, which is widely used in many digital communication systems such as cellular networks and wireless LAN systems. OFDM is a digital multi-carrier modulation scheme that extends the concept of single subcarrier modulation by using multiple subcarriers, or tones, within the same single channel. Rather than transmit a high-rate stream of data with a single subcarrier, OFDM makes use of a large number of closely spaced orthogonal subcarriers that are transmitted in parallel. Each subcarrier is modulated with a conventional digital modulation scheme, such as QPSK (quadrature phase shift keying), 4 QAM, 16 QAM, etc. at low symbol rate. However, the combination of many subcarriers enables data rates similar to conventional single-carrier modulation schemes within equivalent bandwidths. OFDM is known to provide high data rates, strong resistance to multipath effects, and high spectral efficiency. OFDM is also a critical technology in next generation wireless systems, such as cellular 5G.

As part of a signal processing system comprising a transmitter and receiver that processes an OFDM signal, a key step in the processing of such signal at both the transmitter and the receiver is quadrature amplitude modulation ("QAM"), which is a family of modulation methods that conveys two digital bit streams by changing or modulating the amplitudes of two carrier waves. The two carrier waves are out of phase with one another by 90°, and thus are orthogonal to one another. The transmitted signal is created by adding the two carrier waves together. At the receiver, the two waves can be coherently separated (i.e., demodulated) because of their orthogonality property. Such modulations are also low-frequency/low-bandwidth waveforms compared to the carrier frequency. QAM is used extensively as a modulation scheme for digital telecommunication systems. Arbitrarily high spectral efficiencies can be achieved with QAM by setting a suitable constellation size, limited only by the noise level and linearity of the communications channel.

In digital telecommunications, the data is usually binary, such that the number of points in the grid of the constellation diagram is typically a power of 2 (2, 4, 8, . . . ), corresponding to the number of bits per symbol. The simplest and most commonly used QAM constellations consist of points arranged in a square, i.e., 16-QAM, 64-QAM, and 256-QAM.

Previous efforts have modeled the cruise phase of an aeronautical channel and showed how the channel varied as a function of height, distance, and speed of the aircraft. From that analysis, it was found that the "cruise" channel exhibited remarkable stability and varied slowly and predictably over time. The steady state channel reflected a 2-ray multipath model that exhibits deep nulls in the spectrum, which significantly affects serial tone modems. Further, the application of parallel tone modulation may improve performance except for that portion of the band that was degraded by the null.

It would therefore be advantageous to provide adaptive OFDM (AOFDM) systems and methods that maximize the modulation scheme for each of the OFDM tones, wherein tones are only sent in portions of the band that are strong, and not in areas where the signal is weak.

SUMMARY OF THE INVENTION

With particular regard to transmission of OFDM signals in communication channels exhibiting frequency selective fading, such as (by way of non-limiting example) aeronautical channels, cellular channels, and the like, efforts have been made to develop aeronautical radio channel system models that adapt to different channel conditions, and that select coding rates according to real time measurements. Such a model is referred to at times herein as Link Dependent Adaptive Radio (LDAR). LDAR essentially consists of a transmitter, the wireless channel, and a receiver. The transmitter has an encoder and may utilize various modulation schemes. Disclosed herein are systems and methods for implementing an LDAR system that adapts to the radio channel conditions, and more particularly adapts each OFDM modulation tone and optimizes data to lower error rates in delivering telemetry signals. The adaptation of modulation schemes and code rate takes place after the signal-to-distortion ratio ("SDR") is computed. Based on a predetermined table, LDAR decides on the next set of parameters for transmission.

LDAR configured in accordance with aspects of the invention uses different modulation schemes based on real-time channel conditions. SDR is used to accommodate the best data rate. Error measurements may also be compared to a threshold value to achieve link adaptation.

Adaptation mechanisms such as SDR are measured in real time to select a data rate for the communicating entities that improves the bandwidth efficiency while maintaining the quality and reliability of the channel. An adaptive OFDM scheme (AOFDM) as described herein is an ideal candidate as it selects the optimum modulation scheme for each tone in the OFDM symbol.

Systems and methods configured in accordance with aspects of the invention adapt OFDM for applications having communication channels exhibiting frequency selective fading, such as by way of non-limiting example a telemetry application that includes aircraft and low earth orbiting satellites. The use of an AOFDM structure can be applied in which tones are only sent in portions of the band that are strong, and not sent in areas where the signal is weak. Systems and methods configured in accordance with aspects of the invention capture a profile of SDR for each tone for each frame and over time, and converts the SDR per tone to estimate the optimal QAM scheme for each tone for application in the LDAR system. Such systems and methods may improve communications for applications with channels exhibiting frequency selective fading by optimizing data throughput and tones produced, effectively allowing for better modulation schemes to be implemented.

An OFDM communication channel may be modeled to replace traditional point-to-point communication as shown in the OFDM Block Diagram of FIG. 1. As shown in that Figure, at the transmitter side, the data bit stream passes into a transmitter-side OFDM Signal Transmitter 100, where the data bit stream passes through an encoder 102 that implements the encoding for error control. The encoded bits are QAM-encoded in the modulation block 104. The encoded bits are parsed via a serial-to-parallel converter 106 where an Inverse Fast Fourier Transform (IFFT) process converts the signal from the frequency domain to the time domain. To reduce Inter Symbol Interference (ISI) during transmission, Cyclic Prefix is applied at block 108 before the data is transmitted by transmitter output 110 into the radio channel 150. Once that transmitted data is received at receiver input 210, the reverse operations are then applied at the OFDM Signal Receiver 200 to process the transmitted data. At the OFDM Signal Receiver 200, the cyclic prefix is removed at block 208 and a Fast Fourier Transform (IFFT) is applied at 206 to convert the signal from the time domain to the frequency domain. The FFT output is parsed via a parallel to serial converter, and QAM demodulation is applied at block 204. A QAM demodulated signal is decoded at 202, which results in the received bit stream which estimates the source data.

In accordance with certain aspects of an embodiment of the invention, the systems and methods described herein enable differing modulation schemes to be applied to the encoded data bit stream, and particularly differing QAM modulation schemes. As discussed in detail below and with particular reference to FIG. 2, OFDM Signal Receiver 200 computes SDR in the received OFDM signal, determines an appropriate modulation scheme that is to be used in further transmissions from OFDM Signal Transmitter 100, and transmits such determined QAM modulation scheme back to OFDM Signal Transmitter 100 as feedback 300, which process is repeated over successive transmissions to provide a real-time adjustment to the QAM modulation scheme.

Still other aspects, features and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The numerous advantages of the present invention may be better understood by those skilled in the art by reference to the accompanying drawings in which:

FIG. 9 is a schematic view of a diversity combining system in accordance with certain aspects of an embodiment of the invention.

FIGS. 10(a) and 10(b) show error performance of a diversity combining scheme with one and two antennas, respectively, in accordance with certain aspects of the invention.

FIGS. 11(a) and 11(b) show error performance of a diversity combining scheme with four and six antennas, respectively, in accordance with certain aspects of the invention.

DETAILED DESCRIPTION

The invention summarized above may be better understood by referring to the following description, claims, and accompanying drawings. This description of an embodiment, set out below to enable one to practice an implementation of the invention, is not intended to limit the preferred embodiment, but to serve as a particular example thereof. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form.

Descriptions of well-known functions and structures are omitted to enhance clarity and conciseness. The terminology used herein is for the purpose of describing particular embodiments only and is not intended to be limiting of the present disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced items.

The use of the terms "first", "second", and the like does not imply any particular order, but they are included to identify individual elements. Moreover, the use of the terms first, second, etc. does not denote any order of importance, but rather the terms first, second, etc. are used to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Although some features may be described with respect to individual exemplary embodiments, aspects need not be limited thereto such that features from one or more exemplary embodiments may be combinable with other features from one or more exemplary embodiments.

Figure 1:
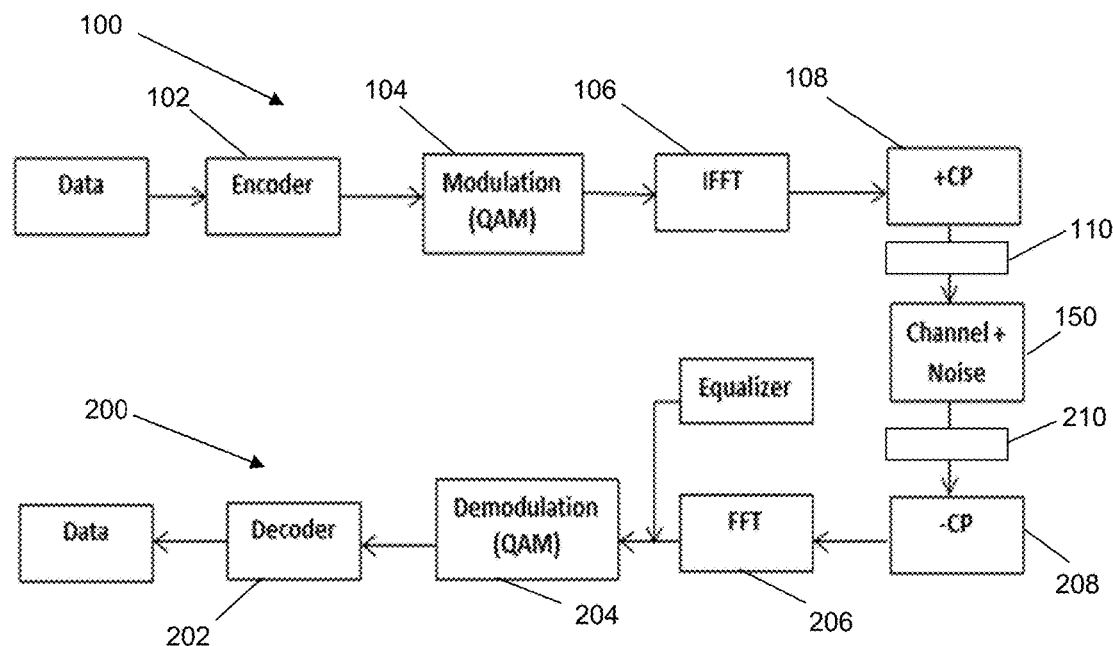
FIG. 1 is a schematic view of a system for transmitting and receiving OFDM signals.
Figure 2:
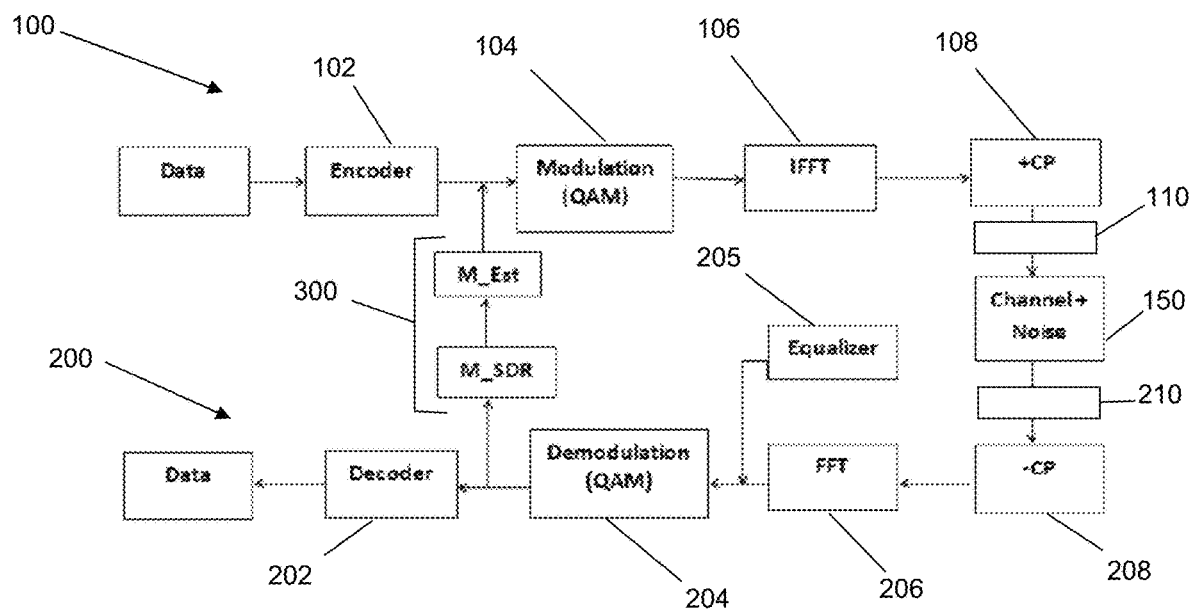
FIG. 2 is a schematic view of a system for transmitting and receiving OFDM signals and employing AOFDM in accordance with certain aspects of an embodiment of the invention.

In accordance with certain aspects of an embodiment, a method for employing AOFDM in a communication channel exhibiting frequency selective fading, such as for example an aeronautical channel for telemetry applications, may utilize the system shown in FIG. 2, in which the digital signal is processed by OFDM Signal Transmitter 100 to generate the OFDM signal that is to be transmitted to OFDM Signal Receiver 200. In contrast with the system shown in FIG. 1, a system employing AOFDM includes a feedback channel (shown generally at 300) that communicates an adaptive M (order) QAM ("MQAM") for each tone for each symbol in the OFDM transmission. The system shown in FIG. 2 comprises a traditional OFDM modulation block 104 and demodulation block 204, communication channel 150, an adaptive equalizer 205, and feedback channel 300 providing information to adapt the modulation structure M in a MQAM scheme. In a test scenario employing a simulated communication channel 150, the channel incorporated two approximately equal paths with the addition of noise and a Doppler of approximately 40 Hz. The adaptive equalizer used a simple gradient equalized for amplitude and phase separately based on the estimated error at the receiver. As discussed in detail below, the feedback channel 300 develops an estimate of the best M value for subsequent MQAM frames based on a measurement of SDR at the receiver 200, where the changes are constrained to increment or decrement the M value over a range of M=2, 4, 8, 16, 32, 64.

A system configured in accordance with FIG. 2 thus incorporates an adaption of each OFDM modulation tone on the reverse feedback channel 300. An MQAM modulation structure is provided, in which M corresponds to 2, 4, 8, 16, or 64 QAM symbols per tone, depending upon the channel conditions with 1, 2, 3, 4, or 6 bits of information being carried on the OFDM waveform per symbol. Systems and methods according to certain aspects of the invention exploit the short-term stationarity of the channel, wherein the channel will change very slowly such that the reverse feedback channel 300 information that is required by such systems and methods remains low. Likewise, such systems and methods are particularly configured to function with the 2-ray channel configuration, as is the typical configuration in any air to ground radio link. Systems and methods configured in accordance with aspects of the invention may exhibit the following features: (i) incorporation of AOFDM, which optimizes data throughput for each tone in the OFDM waveform; (ii) adaptation of the modulation structure per tone based on an SDR measured at the receiver 200; (iii) computing the optimal modulation structure per tone at the receiver 200 based on the measured SDR and transmitting the optimal modulation structure to the transmitter 100; and (iv) comprise a stable 2-ray channel configuration to accommodate, for example, standard aeronautical channels.

The data bit stream in the OFDM system of FIG. 2 is sent out by the source to encoder 102. Different modulation schemes are applied at modulation block 104 on the encoded data bit stream as discussed in greater detail below. The modulation schemes particularly use QAM. The output of the modulation symbols from modulation block 104 are then mapped into consecutive blocks through a serial-to-parallel converter 106 and Inverse Fast Fourier Transform (IFFT) is performed in the symbols. Cyclic Prefix is applied at block 108 before the data is transmitted from transmitter output 110 into the radio channel 150.

At the receiver 200, the opposite operations of transmitter 100 are applied on the received data. The receiver 200 attempts to get the original data which is affected by different effects on the channel 150 such as noise. After the data is received at receiver input 210, the cyclic prefix is removed at block 208. A Fast Fourier Transform (FFT) is applied at block 206 to convert the modulated data into the frequency domain. The modulated data then passes through the demodulation block 204 and the decoder 202. The decoded symbols are then converted into a binary stream of data as output.

As noted above, in the configuration shown in FIG. 2 and in accordance with aspects of the invention, to implement AOFDM in such a system a high-speed binary serial input data sequence is divided into N parallel lower-speed binary streams. For each stream indexed by n, where n=0, 1, . . . , N−1, every M number of bits are grouped together and mapped onto complex values $C_0=A_n+jB_n$ according to a QAM constellation mapping consisting of 2M states. Usually, the Inverse Fast Fourier Transform (IFFT) is used in a discrete multi-tone (DMT) transmitter to efficiently modulate the complex values $C_n$ onto N different subcarrier frequencies, which as a result are mutually orthogonal.

In order to achieve a real-valued, baseband AOFDM transmission sequence consisting of N subcarriers, a 2N-point IFFT is needed. For the 2N inputs of the IFFT, indexed by n=0, 1, . . . , 2N−1, the first half are assigned the values $C_n$ and the second half have to be assigned the complex conjugate values of $C_n$, following the Hermitian symmetry property.

Methods carried out in accordance with certain aspects of the invention to employ AOFDM schemes will now be described. In conventional OFDM systems, at the transmitter 100, the bit stream is parsed into M/2 sub-channels. The parsing allocates a suitable number of bits into each sub-channel based on the SNR. Afterwards, the sub-channel bit streams are QAM-encoded, resulting in M/2 complex symbols. In the instant AOFDM methods, SDR measurements are employed to adapt the allocation.

Let $E[|x_i|^2]=\sigma^2$ be the power of the input signal and $\hat{x}_i$ is the signal after clipping. Then the SDR is given as $$SDR = \frac{E[|x_i|^2]}{E[|\hat{x}_i - x_i|^2]}$$

For X, the time domain signal, n-sub-carriers with data $d_0$, $d_1$, . . . , $d_{n-1}$ could be detected at the receiver. The data sequence is extracted from the noisy version of X with an error as low as possible. We must design $$|x_k - d_k| < \varepsilon d_{min}, \forall i=0,1,2, \ldots, n-1$$

when $d_{min}$ is the minimum distance among constellation points in the chosen constellation for the data symbols. Note that only if $0<\varepsilon<0.5$ is satisfied may the data symbol $d_k$ be recovered from $x_k$ without ambiguity. The value $|x_k-d_k|$ for k=0, 1, 2, . . . , n−1 represents in-band distortion on the $k^{th}$ data symbol, $d_k$.

The adaptation mechanism takes place after the SDR is computed. Based on a predetermined table, LDAR decides on the next set of parameters for transmission. At the receiver 200, SDR measurement per sub-channels of the AOFDM (M_SDR) are used to estimate the suitable number of bits per symbol of the corresponding subchannel ($M_{Est}$).

Once $M_{Est}$ values are determined at the receiver 200, these values are used as feedback to the transmitter 100 through feedback channel 300 to schedule the adaptive transmission using suitable M-QAM modulation schemes ($M_{est}$) at modulation block 104 that employ the determined M for the MQAM for each tone. This is repeated over successive transmissions, making it an adaptive OFDM.

In a test implementation of the foregoing system and method using a simulation environment, the channel was set as a 2-ray model with 25 dB null, which is a typical steady-state aeronautical channel. Next, a 40 Hz phase shift was introduced into the channel, with symbol rate of 4 microseconds. Compared to the 40 Hz doppler shift, the symbol rate is relatively small and the channel is semi-stationary. The 40 Hz doppler is twice the amount that would be observed for a Mach 1 test article, when the test article is perfectly aligned with the direction of the base station, presenting the worst-case scenario. At this stage, an adaptive gradient equalizer was introduced for each tone with 100 frames of training. The equalizer can adapt with a particular amplitude and phase of the error associated with the channel.

The AOFDM scheme described above was tested over a simulated test flight developed for a typical aeronautical application. This testing included all of the channel, noise, and Doppler conditions as above, and provided performance results over a wide array of channel conditions as the test article traveled toward the horizon and returned.

The MQAM's estimated values for the experiment were 64, 32, 16, 8, 4 and 2 QAM. The rate and structure of the QAM was designed to increase or decrease, in order to adjust the average error rate around $10^{-4}$. This adjustment was made considering the measured distortion and the threshold. The entropy of M-changes for each tone was measured for the back channel. Next, the data throughput was measured during each test: 6 bits per tone for 64 QAM, 5 bits per tone for 32 QAM, 4 bits per tone for 16 QAM, 3 bits per tone for 8 QAM and 2 bits per tone for 4 QAM. Considering the Signal to Noise Ratio (SNR) of the channel, these data throughputs compared well with the Shannon Limit.

This design also added the feature to send zero data on severely degraded tones and where the M values were set to 2. This had a considerable impact on the overall performance as it avoided the unnecessary introduction of errors and simplified the job of error correction or detection.

Figure 3:
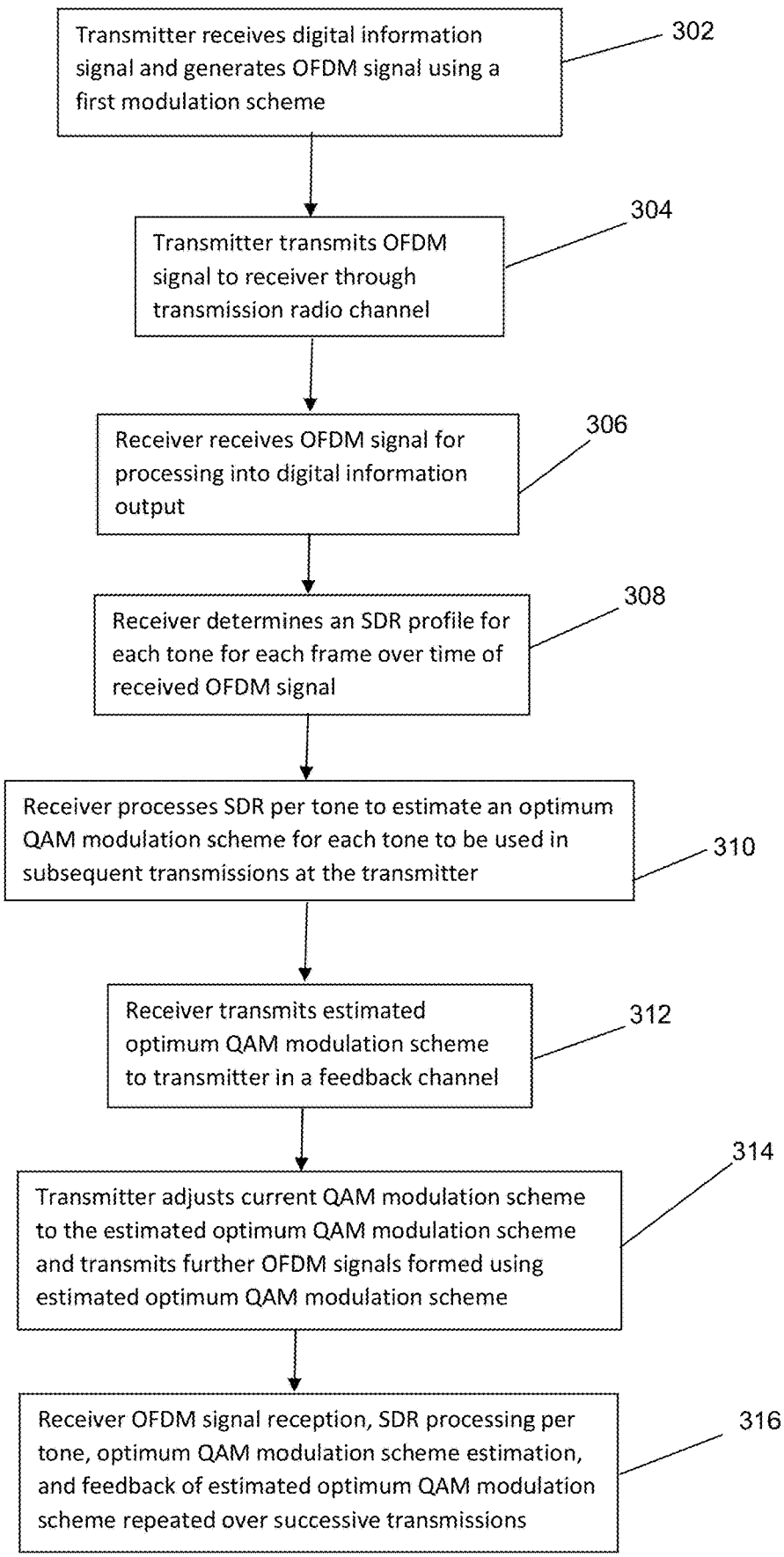
FIG. 3 is a flowchart depicting a method for transmitting OFDM signals and employing AOFDM in accordance with certain aspects of an embodiment of the invention.

FIG. 3 provides a flowchart summarizing a method for transmitting OFDM signals and employing AOFDM in accordance with certain aspects of an embodiment of the invention. As shown at step 302, transmitter 100 having an OFDM signal processor receives a digital information signal and generates an OFDM signal configured as described above using a first modulation scheme, which in exemplary configurations comprises one of various QAM modulation schemes. At step 304, the transmitter 100 transmits the OFDM signal to receiver 200 through transmission channel 150 that exhibits frequency selective fading, such as an aeronautical, 2-ray radio channel. At step 306, receiver 200 receives the OFDM signal from transmission channel 150 for processing of the OFDM signal back into digital information as its ultimate output. At step 308, receiver 200 determines an SDR profile for each tone for each frame over time of the received OFDM signal. At step 310, receiver 200 processes the SDR per tone to estimate an optimum QAM modulation scheme for each tone to be used in subsequent transmissions from transmitter 100. At step 312, receiver 200 transmits the estimated optimum QAM modulation scheme to the transmitter through feedback channel 300. At step 314, transmitter 100 adjusts the current QAM modulation scheme to the estimated optimum QAM modulation scheme and transmits a further OFDM signal formed using the estimated optimum QAM modulation scheme. Finally, at step 316, OFDM signal reception at receiver 200, SDR processing per tone, optimum QAM modulation scheme estimation, and feedback of the estimated optimum QAM modulation scheme (all as described above) are repeated over successive transmissions, thus providing a truly adaptive OFDM transmission system.

Testing of the foregoing simulated system employing aspects of the invention consisted of two independent runs of the system with a flight simulation. The first case used the AOFDM structure described below and the second case operated with a fixed structure with 4QAM, where the results were comparable to a simple QPSK modulation scheme. The flight simulation simulated 6 states which are taxi, takeoff, cruise and a return with cruise, landing and taxi. The emphasis of this test was the cruise phase of the flight as would be the case for a telemetry application. The most significant feature of the test is the variation of the SNR of the channel during the cruise phase. For both the AOFDM and the Fixed OFDM runs, data was captured for the SNR, data throughput, bit errors and Bit Error Rate (BER) versus time as well as a measure of the net throughput and errors. These values are shown in FIGS. 4 and 5.

Figure 4:
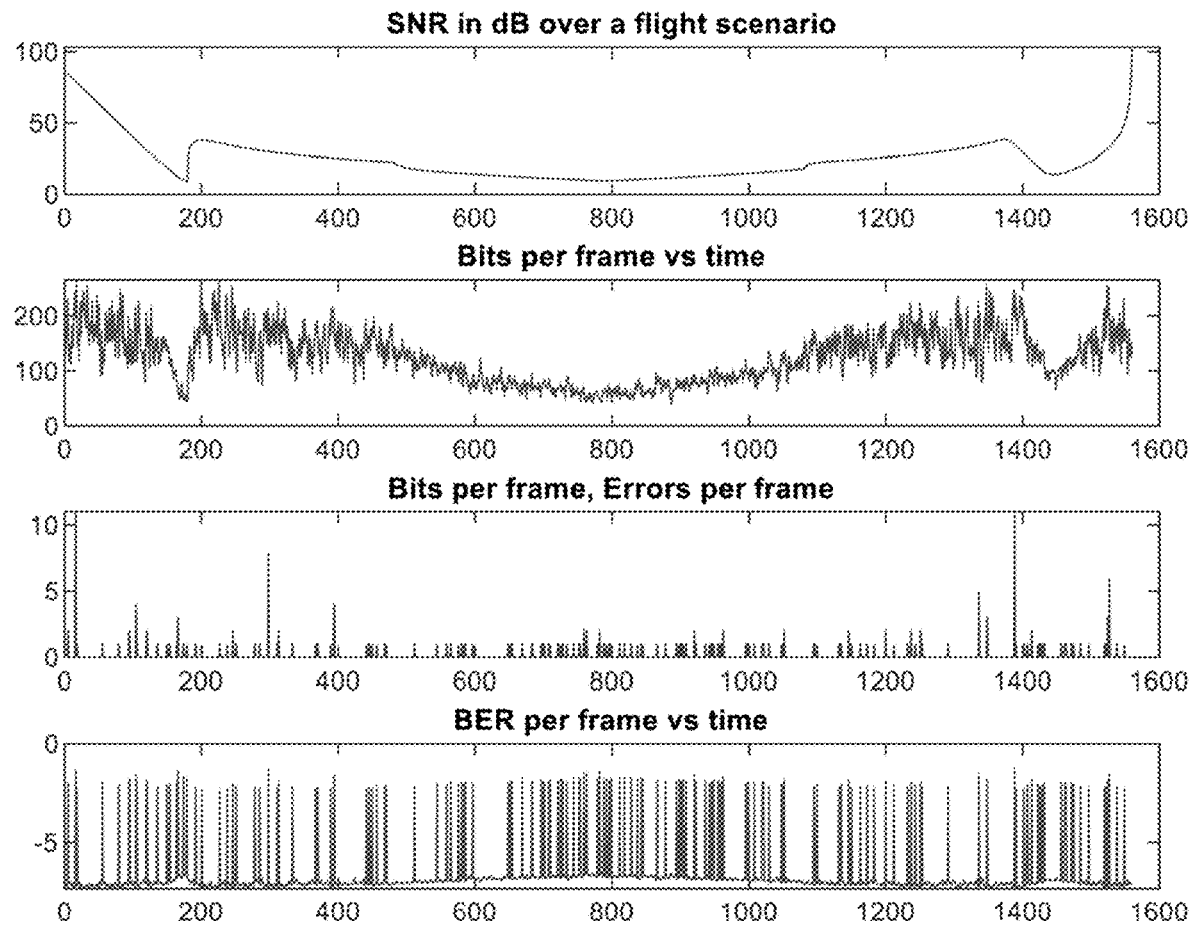
FIG. 4 is a series of graphs reflecting performance results for an AOFDM test flight in which AOFDM was applied according to certain aspects of the invention.

The performance of the test flight for the AOFDM scheme was captured over approximately 1600 frames of AOFDM, as shown in FIG. 4. The SNR for this flight varied from about 40 dB SNR at the beginning of the cruise phase (frame 200) to about 9 dB SNR at the furthest range of the flight (frame 800). The total data transmitted was 195,903 bits and the total errors were 226, yielding a BER of 0.0012. Note that the total bits/frame in FIG. 4 tracks with the SNR from more than 200 bits per frame on the better channels (~frame 200) to about 50 bits/frame on the poor channels (~frame 800). Most of the frames were error free while most of the error was in clumps of 1 or 2 errors per frame. Most significantly, the BER on the worst channel (~frame 800) was comparable to the BER on the better channels. This points to a robustness over the range of conditions that is desirable.

Figure 5:
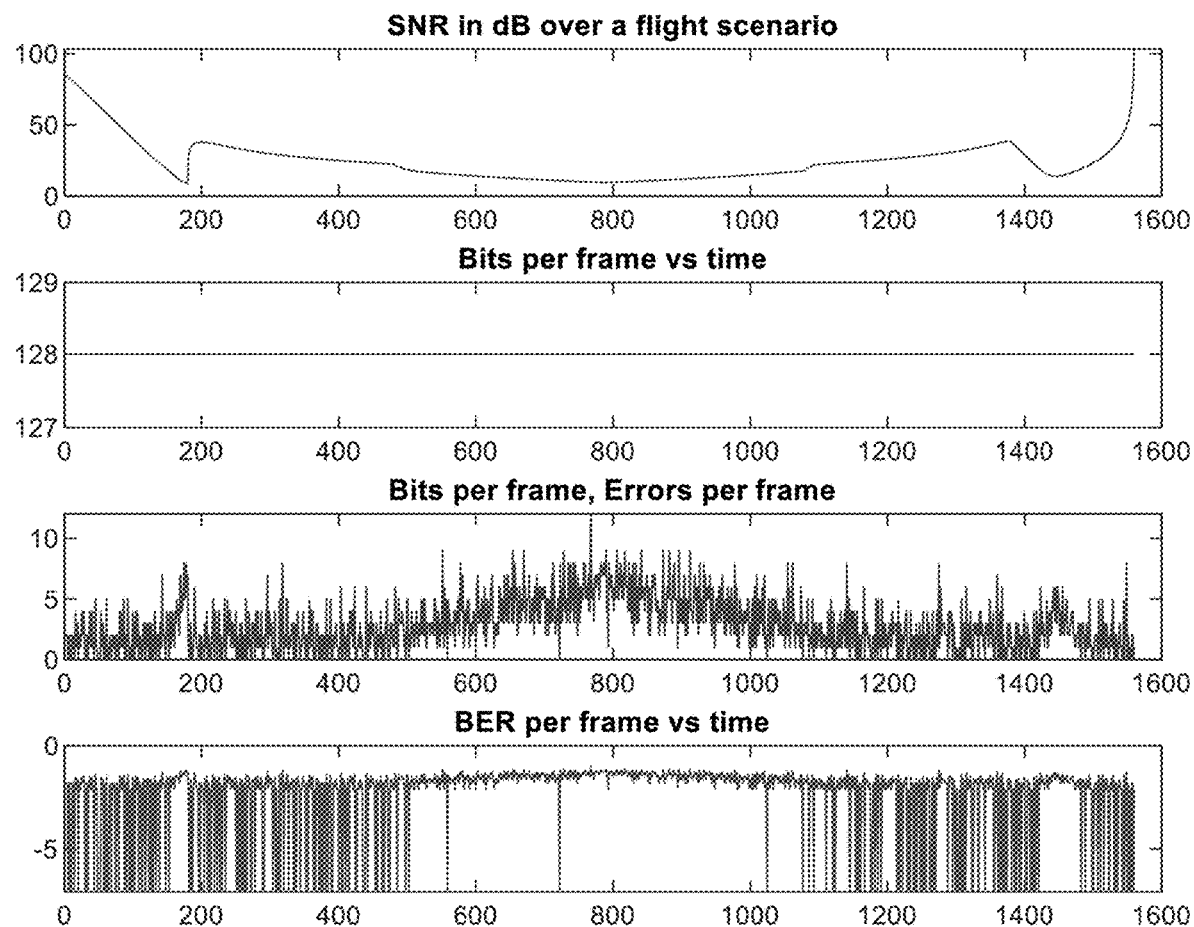
FIG. 5 is a series of graphs reflecting performance results for a fixed rate (M=4) test flight.

In contrast, the performance of the test flight for the fixed rate (M=4) scheme was captured over approximately 1600 frames of OFDM, as shown in FIG. 5. This second test was performed with the same flight simulator and channels as the test reflected in FIG. 4. In this case the modulation of the OFDM was fixed at M=4 or QPSK. The SNR range was identical to Case 1 above as were all the other channel conditions. The overall throughput of the channel was about 204,800 while the total errors were about 4096 with a BER of 0.02 or 2 percent. Thus, while the overall throughput of the fixed scheme was comparable to the variable scheme, the error rate made the data almost unusable. It should be noted that a serial tone modem such as QPSK or SOQPSK might have better error performance than shown here with the addition of adaptive equalization and Error Correction. However, this is a challenging channel for such schemes as with deep nulls in the spectrum and the rapid transition in phase shift.

Based on the foregoing, an AOFDM scheme configured in accordance with aspects of the invention for application to transmissions through channels exhibiting frequency selective fading is found to be near optimum for the types of channels experienced. The results show that using the AOFDM scheme, it is feasible to adapt the modulation of an OFDM MQAM structure, capable of performance in a broad range of conditions, and with comparison to a fixed rate M=4 scheme. AOFDM provides improved data rates in channels exhibiting frequency selective fading, and particularly severely degraded 2-ray paths that are the norm in steady state flight, over single serial tone modulation schemes such as QPSK by adapting QAM sizes for the different tones based on SDR measurements. In the foregoing method, because only good portions of the channel are used, systems and methods configured in accordance with aspects of the invention avoid the huge error conditions expected in the null area of the signal and produce a manageable error rate for the other areas of the signal. OFDM tones in high error regions are blanked and avoided at the receiver.

In certain configurations, in addition to applying an AOFDM scheme in a communication channel exhibiting frequency selective fading, diversity combining may be incorporated into OFDM transmission in such channels, either with or without AOFDM processing as described above. Diversity combining in accordance with further aspects of the invention takes further advantage of the unique properties of the two-ray channel that dominates aeronautical telemetry, as discussed above. More particularly, diversity combining takes advantage of the existence of deep nulls in the channel that depend on the difference in the differential delay of the paths, and combines multiple antenna channels that are offset in space so that the nulls appear at different frequencies. As discussed in detail below, an optimum combining scheme may be provided that enables enhanced performance on 3 dB SNR channels.

Figure 6:
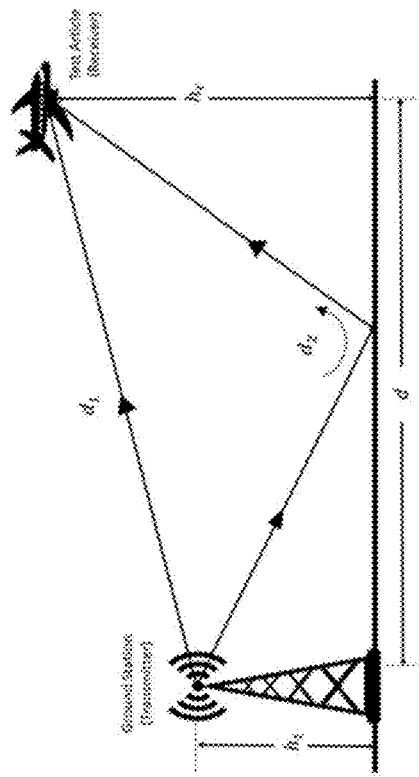
FIG. 6 is a schematic view of a two-ray channel model in accordance with certain aspects of an embodiment of the invention.

A two-ray ground reflection model shows a line of sight and a ground reflection path between the test article and ground station that satisfies the laws of physics based on geometric optics. The aeronautical two-ray channel is reflected in FIG. 6. Knowing the speed and position of the test article, the distance and height of the test article from the ground station as a function of speed and climbing angle for each second may be computed as:

distance,$d(t)=d(t-1)+\cos(\theta(t)*v(t))$ height,$h(t)=h(t-1)+\sin(\theta(t)*v(t))$ where $\theta(t)$=climbing angle of the test article at time t, and $v(t)$=speed of the test article at time t.

Using the so-called "method of images" (T. Rappaport, Wireless Communications, Principles and Practices, 2nd Edition, Prentice Hall PTR, Upper Saddle River, N.J. 07458), the path difference $\Delta$, between the line of sight and ground reflection can be expressed as $\Delta = d'' - d' = \sqrt{(h_t+h_r)^2+d^2} - \sqrt{(h_t-h_r)^2+d^2}$ Once the path difference $\Delta$ has been calculated, the phase difference $\theta_\Delta$ and time delay $\tau_d$ between the arrival of two components can be computed by the following relation:

$$\theta_\Delta = \frac{2\pi\Delta}{\lambda} = \frac{\Delta w_c}{c}$$

Figure 7:
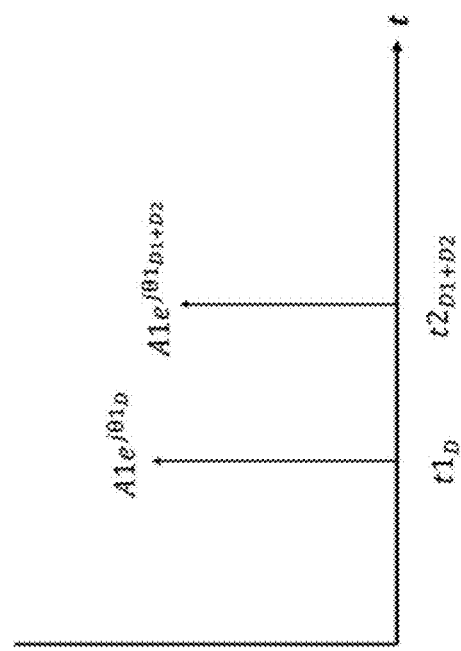
FIG. 7 is a model of impulse response with delay and phase shift per tap in a two-ray aeronautical channel.

Using the two-ray model, the phase difference in the two tones of the impulse response may be calculated. The phase difference between the direct path and the reflected path has been modeled using the above-mentioned physics of the two-ray model. Modelling of the impulse response with delay and phase shift per tap is shown in FIG. 7.

Figure 8:
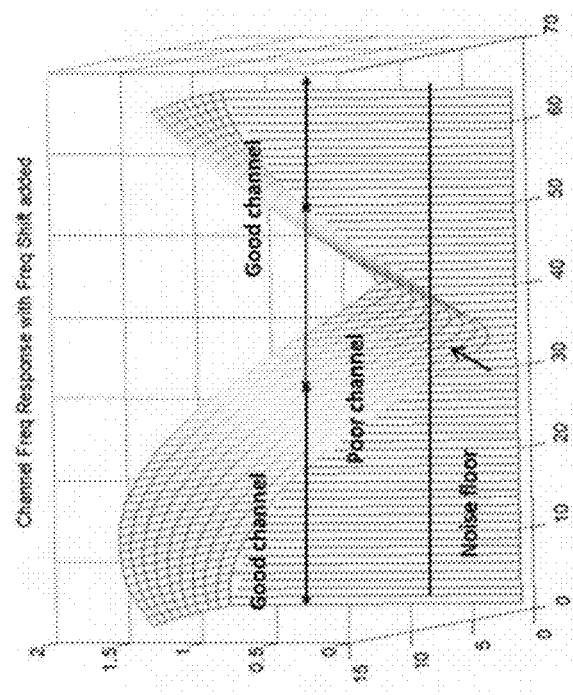
FIG. 8 is a graph of frequency response over time of a two-way aeronautical and showing null varying across the spectrum over time.

FIG. 8 shows, at each time t, each path arrives after a delay $\Delta t$, which is a function of the distances for the direct path d and the reflected path d1+d2, and each path arrives at an amplitude A1 and A2 at phases θ1 and θ2. The calculation of the angle increment per tap is then performed using the above equation for computing the phase difference $\theta_\Delta$. When all such considerations are applied to the simulated aeronautical channel, a spectrum is generated showing a classical null that varies across the spectrum over time, as shown in FIG. 8. FIG. 8 also shows the opportunity for OFDM modulation where certain tones have a good channel and other tones have a poor channel.

A diversity combining OFDM scheme configured in accordance with aspects of the invention serves to find multiple independent representations of the channel offset sufficiently in phase such that one or more of these representations will comprise a good channel. Such a representation would be an array of vertically stacked antennas such that each antenna's output is a phase shifted version of the response. The resulting 4 responses will be equally spread across the phase space. Note that in the spectrum, one or more tones has a good response.

A diversity combining system may be provided in accordance with aspects of the invention that accumulates N independent channels and weighs the contribution of each channel proportional to its SNR. Such a system may be referred to as a Maximum Likelihood Combining (MLC) scheme. A representation of such a novel system is shown in FIG. 9. Key to this structure is the use of an adaptive equalizer that operates tone by tone using a simple gradient technique for the amplitude and phase separately. This approach equalizes each OFDM tone (k) with an amplitude |Wk| and a phase Th(k), and then does a weighted sum of the outputs where the weights are 1/|Wk|. If the channel noise is uniform then the combiner is the optimal MLC described above.

Figure 12:
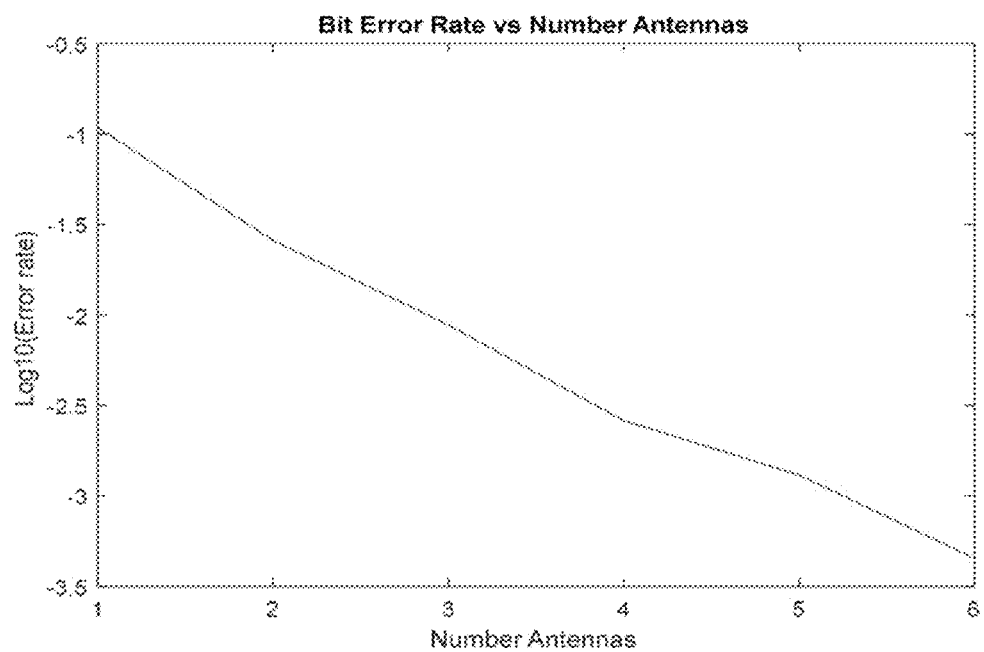
FIG. 12 is a log 10 graph of bit error rate versus number of antennas in a diversity combining system in accordance with certain aspects of the invention.

A diversity combining scheme as described above was developed in a simulated environment to demonstrate the performance of such a system. A classical 2-ray channel was selected with a 3 dB SNR. In each case a Monte Carlo simulation with 800 frames of 64 tone OFDM was tested where the number of antennas was varied from 1 to 6. The first case is instructive with just one and two antennas as shown in FIGS. 10(a) and 10(b). The results show for one antenna the presence of errors by tone and by symbol over the whole 500 frame experiment. In this case and as expected, the signal is barely perceptible and the null is near tone 50. The overall bit error rate (BER) is about 10%, thus indicating a very poor channel. The two antenna case shows the beginning of some signal structure with an overall BER of about 2%. Examples of 4 and 6 tones are shown in FIGS. 11(a) and 11(b). Clearly, results for 4 antennas is better (BER of 0.3%) and the results for 6 antennas is significantly better (BER of 0.03%). These results on a 3 dB SNR channel with severe phase and amplitude distortion is significant. A plot of the BER results for configuration 1-6 shown in FIG. 12, reflecting a clear trend of improvement with added antennas.

Figure 13:
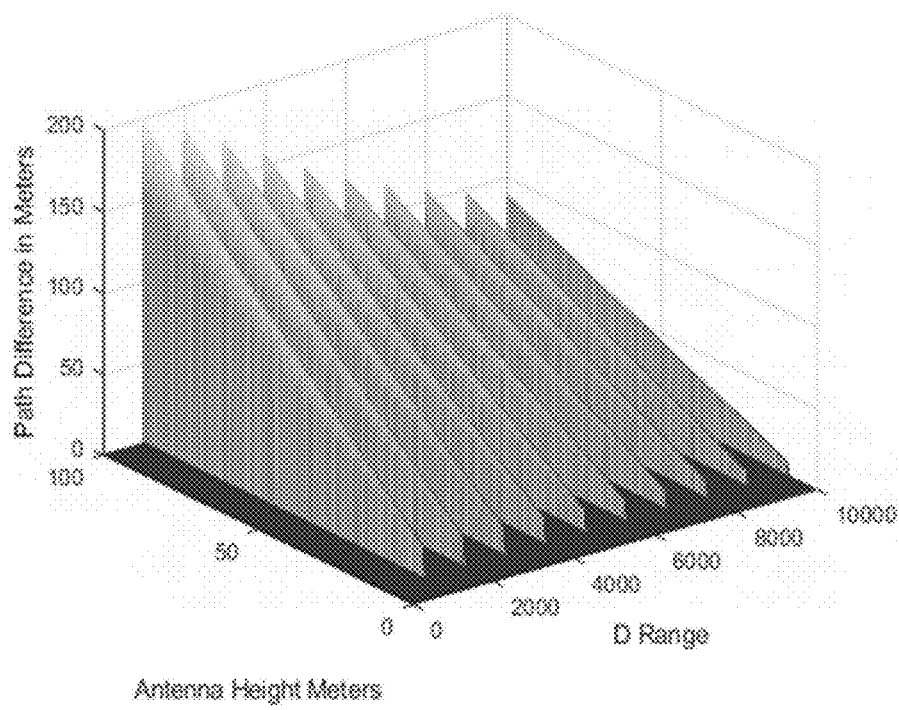
FIG. 13 is a graphical representation of path difference versus range and antenna height in a diversity combining system in accordance with certain aspects of the invention.

The diversity combining scheme discussed above depends upon the ability to configure antennas in a practical way for combining. Assuming a commonly used L band system at 1.5 GHz with a wavelength of about 0.2 m, one may compute the phase difference of antennas at various heights for a vertically stacked array. Based on the equation above for calculating the path difference Δ, the variation of path differential can be shown over TA height, range and antenna height for values of antenna heights from 0-100 m as shown in FIG. 13. This shows that reasonable antenna heights provide sufficient path (phase) differences such that a compromise choice of antenna heights will provide diverse channels for combining.

Based on the foregoing, systems and methods employing diversity combining of independent antennas in similarly configured applications may provide usable data with 4-6 diversity antennas on a 2-ray channel with just 3 dB SNR.

Figure 14:
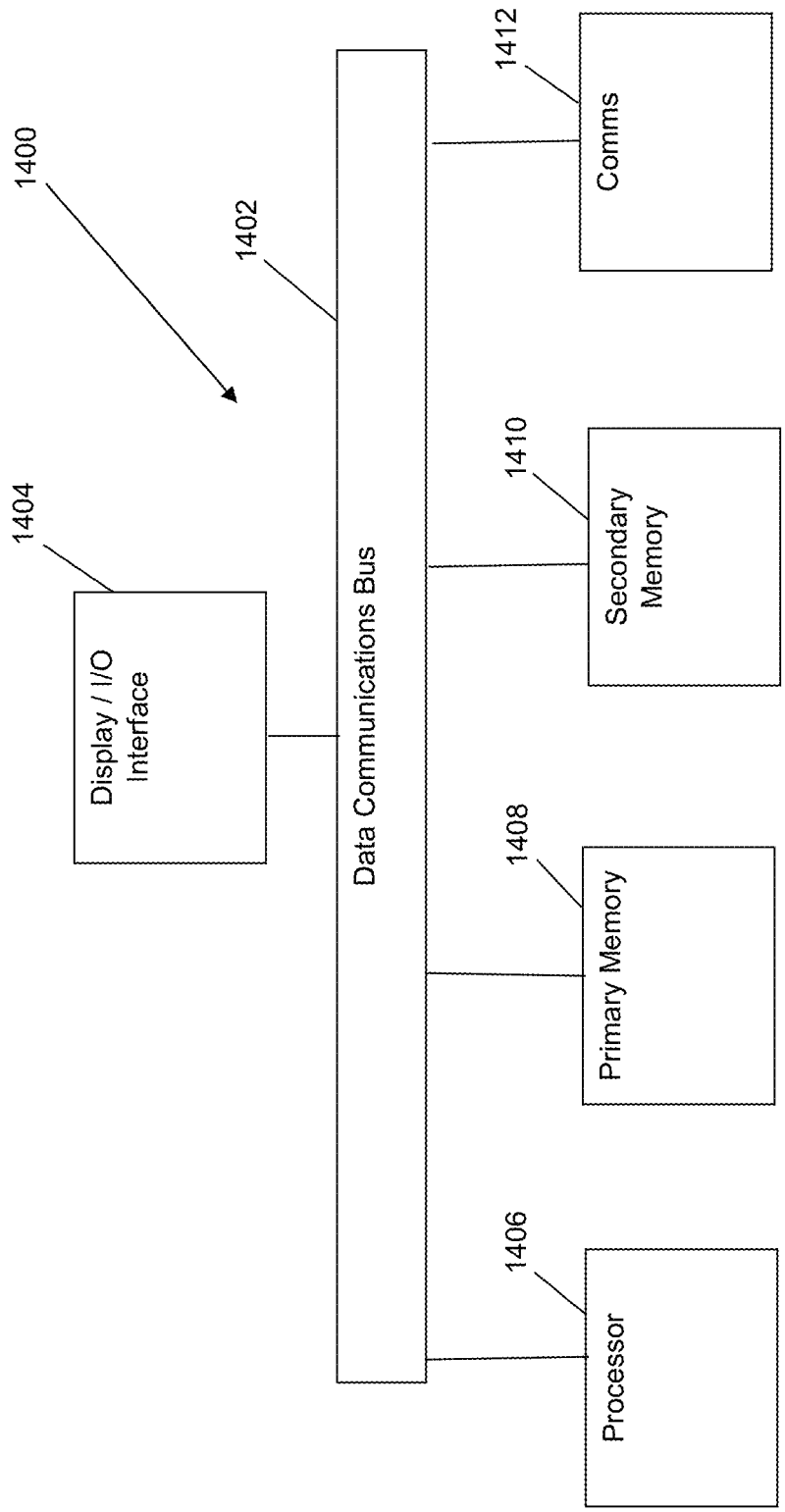
FIG. 14 is a schematic view of a data processing system for implementing at least portions of a feedback channel in an AOFDM signal processing system in accordance with certain aspects of an embodiment of the invention.

Those skilled in the art will recognize that at least portions of feedback channel 300 as described above, in addition to other elements of transmitter 100 and receiver 200, may take the form of computer system 1400 as reflected in FIG. 14, though variations thereof may readily be implemented by persons skilled in the art as may be desirable for any particular installation. In each such case, one or more computer systems 1400 may carry out the foregoing methods as computer code.

Computer system 1400 preferably includes a communications bus 1402, or other communications infrastructure, which communicates data to other elements of computer system 1400. For example, communications bus 1402 may communicate data (e.g., text, graphics, video, other data) between bus 1402 and an I/O interface 1404, which may include a display, a data entry device such as a keyboard, touch screen, mouse, or the like, and any other peripheral devices capable of entering and/or viewing data as may be apparent to those skilled in the art. Further, computer system 1400 includes a processor 1406, which may comprise a special purpose or a general purpose digital signal processor. Still further, computer system 1400 includes a primary memory 1408, which may include by way of non-limiting example random access memory ("RAM"), read-only memory ("ROM"), one or more mass storage devices, or any combination of tangible, non-transitory memory. Still further, computer system 1400 includes a secondary memory 1410, which may comprise a hard disk, a removable data storage unit, or any combination of tangible, non-transitory memory. Finally, computer system 1400 may include a communications interface 1412, such as a modem, a network interface (e.g., an Ethernet card or cable), a communications port, a PCMCIA slot and card, a wired or wireless communications system (such as Wi-Fi, Bluetooth, Infrared, and the like), local area networks, wide area networks, intranets, and the like.

Each of primary memory 1408, secondary memory 1410, communications interface 1412, and combinations of the foregoing may function as a computer usable storage medium or computer readable storage medium to store and/or access computer software including computer instructions. For example, computer programs or other instructions may be loaded into the computer system 1400 such as through a removable data storage device (e.g., a floppy disk, ZIP disks, magnetic tape, portable flash drive, optical disk such as a CD, DVD, or Blu-ray disk, Micro Electro Mechanical Systems ("MEMS"), and the like).

Thus, computer software including computer instructions may be transferred from, e.g., a removable storage or hard disc to secondary memory 1410, or through data communication bus 1402 to primary memory 1408.

Communication interface 1412 allows software, instructions and data to be transferred between the computer system 1400 and external devices or external networks. Software, instructions, and/or data transferred by the communication interface 1412 are typically in the form of signals that may be electronic, electromagnetic, optical or other signals capable of being sent and received by communication interface 1412. Signals may be sent and received using a cable or wire, fiber optics, telephone line, cellular telephone connection, radio frequency ("RF") communication, wireless communication, or other communication channels as will occur to those of ordinary skill in the art.

Computer programs, when executed, allow processor 1406 of computer system 1400 to implement the methods discussed herein for optimizing OFDM telemetry communications according to computer software including instructions.

Computer system 1400 may perform any one of, or any combination of, the steps of any of the methods described herein. It is also contemplated that the methods according to the present invention may be performed automatically, or may be accomplished by some form of manual intervention.

The computer system 1400 of FIG. 14 is provided only for purposes of illustration, such that the invention is not limited to this specific embodiment. Persons having ordinary skill in the art are capable of programming and implementing the instant invention using any computer system.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It should be understood, therefore, that the invention may be practiced otherwise than as specifically set forth herein.

What is claimed is:

1. A method of optimizing OFDM telemetry communications, comprising the steps of:

generating an OFDM signal from a digital information signal using a current signal modulation scheme at a transmitter having a transmitter OFDM signal processor;

transmitting said OFDM signal from said transmitter to a receiver having a receiver OFDM signal processor through a radio channel;

determining at the receiver OFDM signal processor an optimum modulation scheme to apply to further transmissions from said transmitter based upon a real-time determination of signal distortion in said OFDM signal received at the receiver;

transmitting an indication of said optimum modulation scheme from said receiver to said transmitter through a feedback channel; and adjusting said current signal modulation scheme to said optimum modulation scheme at said transmitter OFDM signal processor;

wherein each of said current modulation scheme and said optimum modulation scheme further comprise quadrature amplitude modulation (QAM) schemes; and wherein determining at the receiver OFDM signal processor an optimum modulation scheme further comprises determining a signal-to-distortion ratio (SDR)

profile for each tone for each frame of said OFDM signal received at the receiver, and processing each said SDR profile per tone to estimate said optimum QAM modulation scheme for each tone.

2. The method of claim 1, wherein said radio channel further comprises a radio channel exhibiting frequency selective fading.

3. The method of claim 1, wherein said SDR profile is calculated as $(E[|x_i|^2])/(E[|\hat{x}_i-x_i|^2])$, where $E[|x_i|^2]$ is the power of said OFDM signal received at the receiver and $\hat{x}_i$ is the signal after clipping.

4. The method of claim 1, wherein said SDR profile is used by the receiver OFDM signal processor to select a number of bits per symbol for further transmissions of a corresponding sub-channel from the transmitter.

5. The method of claim 4, wherein the selected number of bits per symbol is one of 1 bit, 2 bits, 3 bits, 4 bits, 5 bits, or 6 bits, corresponding to a 2-QAM, 4-QAM, 8-QAM, 16-QAM, 32-QAM or 64-QAM symbols per tone modulation, respectively.

6. The method of claim 4, wherein said steps of determining said SDR profile at said receiver OFDM signal processor per sub-channel and feedback of said selected number of bits to said transmitter OFDM signal processor is repeated for multiple successive transmissions.

7. A system for optimizing OFDM telemetry communications, comprising:
a transmitter having a transmitter OFDM signal processor storing computer instructions thereon configured to generate an OFDM signal from a digital information signal using a current signal modulation scheme; and
a receiver having a receiver OFDM signal processor in communication with said transmitter through a radio channel, said receiver OFDM signal processor storing computer instructions thereon configured to:
  determine at the receiver OFDM signal processor an optimum modulation scheme to apply to further transmissions from said transmitter based upon a real-time determination of signal distortion in said OFDM signal received at the receiver; and
  transmit an indication of said optimum modulation scheme from said receiver to said transmitter through a feedback channel; and
said transmitter OFDM signal processor storing further computer instructions thereon configured to adjust said current signal modulation scheme to said optimum modulation scheme at said transmitter OFDM signal processor;
wherein each of said current modulation scheme and said optimum modulation scheme further comprise quadrature amplitude modulation (QAM) schemes; and
wherein said computer instructions configured to determine at the receiver OFDM signal processor an optimum modulation scheme is further configured to determine a signal-to-distortion ratio (SDR) profile for each tone for each frame of said OFDM signal received at the receiver, and process each said SDR profile per tone to estimate said optimum QAM modulation scheme for each tone.

8. The system of claim 7, wherein said radio channel further comprises a radio channel exhibiting frequency selective fading.

9. The system of claim 7, wherein said SDR profile is calculated as $(E[|x_i|^2])/(E[|\hat{x}_i-x_i|^2])$, where $E[|x_i|^2]$ is the power of said OFDM signal received at the receiver and $\hat{x}_i$ is the signal after clipping.

10. The system of claim 7, wherein said SDR profile is used by the receiver OFDM signal processor to select a number of bits per symbol for further transmissions of a corresponding sub-channel from the transmitter.

11. The system of claim 10, wherein the selected number of bits per symbol is one of 1 bit, 2 bits, 3 bits, 4 bits, 5 bits, or 6 bits, corresponding to a 2-QAM, 4-QAM, 8-QAM, 16-QAM, 32-QAM or 64-QAM symbols per tone modulation, respectively.

12. The system of claim 10, wherein said computer instructions stored on said transmitter OFDM signal processor and said receiver OFDM signal processor are further configured to repeat determination of said SDR profile at said receiver OFDM signal processor per sub-channel and feedback said selected number of bits to said transmitter OFDM signal processor for multiple successive transmissions.

13. The system of claim 7, said receiver further comprising an array of N antennas, wherein one of multiple independent channels is associated with each antenna of said array of N antennas, said receiver OFDM signal processor storing computer instructions thereon configured to:
  accumulate N of said independent channels from said N antennas; and
  weigh a contribution of each of said N channels proportional to a signal-to-noise ratio associated with each said N channel.

14. The system of claim 13, wherein said computer instructions are further configured to equalize each OFDM tone (k) of said OFDM signal with an amplitude |Wk| and a phase Th(k), and perform a weighted sum of outputs where weights are 1/|Wk|.

15. The system of claim 13, wherein said array of N antennas further comprises an array of vertically stacked antennas.

16. The system of claim 15, wherein an output of each antenna comprises a phase shifted version of a response of said antenna.

* * * * *